May 18, 1954

J. J. PARKER ET AL 2,678,824

WORK HOLDING CHUCK

Filed Nov. 14, 1951

INVENTORS
JOHN J. PARKER &
LONDON T. MORAWSKI
BY
Barnes, Kisselle, Laughlin & Raisch
ATTORNEYS.

May 18, 1954 — J. J. PARKER ET AL — 2,678,824
WORK HOLDING CHUCK
Filed Nov. 14, 1951 — 2 Sheets-Sheet 2
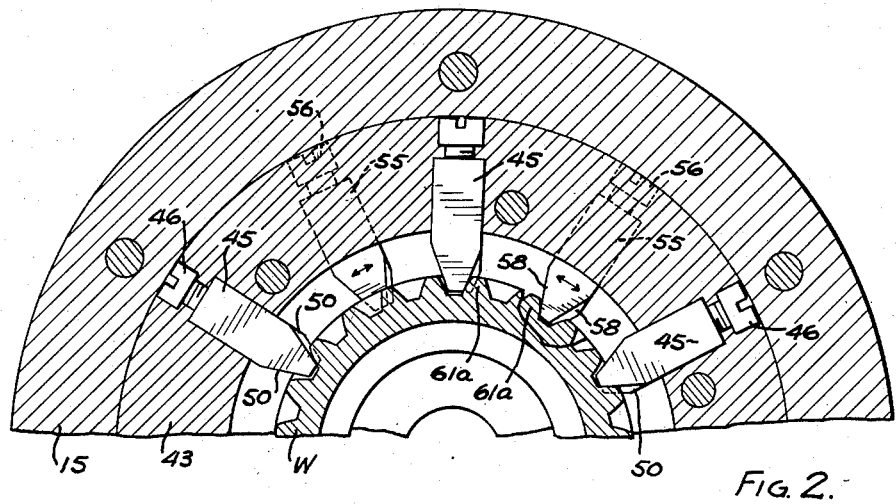
Fig. 2.
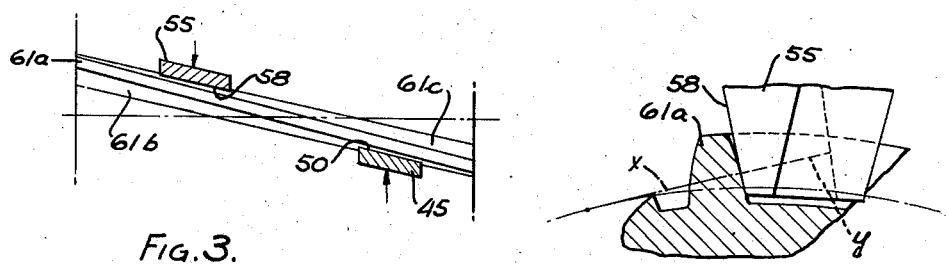
Fig. 3.
Fig. 4.
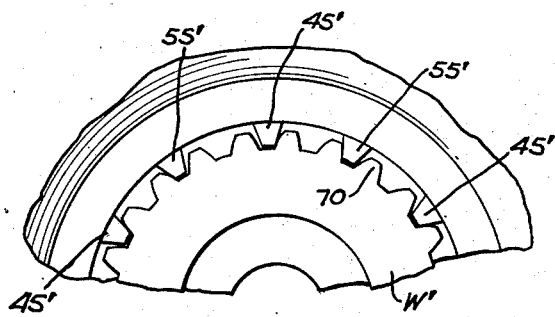
Fig. 5.
INVENTORS
JOHN J. PARKER &
LONDON T. MORAWSKI
BY Barnes, Kisselle, Laughlin & Raisch
ATTORNEYS.

Patented May 18, 1954

2,678,824

UNITED STATES PATENT OFFICE 2,678,824

WORK HOLDING CHUCK

John J. Parker and London T. Morawski, Detroit, Mich.

Application November 14, 1951, Serial No. 256,293

9 Claims. (Cl. 279—1)

This invention relates to a work holder and especially one for holding a work piece provided with a toothed or splined formation.

The work holder of this invention is one adapted to be mounted upon a rotary element, such as the spindle head of a machine tool, and it has operable parts shiftable to grip and engage the work and release the same. The invention also aims to provide a holder for engaging a work piece with helical teeth or splines, such as a helical gear. The work piece is held by its teeth and thus machine operations performed thereon are concentric to or otherwise properly related to the teeth. Work engaging and holding elements are provided for engaging helical teeth and while each helical tooth of a gear presents a curved contour, there is a location where the contour of a helical tooth lengthwise thereof presents a straight line and the work engaging elements are provided with flat faces and are arranged to engage the teeth at the location where the straight line of the contour exists. Thus, the elements may be made at low manufacturing costs and may be provided with ordinary machine operations, since it is not necessary to embody therein curved surfaces or contours for engaging helical teeth.

The accompanying drawings show a tool holder constructed in accordance with the invention and in these drawings:

Fig. 2 is a cross sectional view taken substantially on line 2—2 of Fig. 1 showing the work holding elements.

Fig. 3 is a developed schematic view illustrating a single helical tooth with the work holding elements in engagement therewith.

Fig. 4 is a detailed view showing a tooth of a work piece in section and illustrating substantially the line of contact.

Fig. 5 is a relatively small view similar to Fig. 2 showing the engagement of a work tooth with spur teeth.

Figure 1:
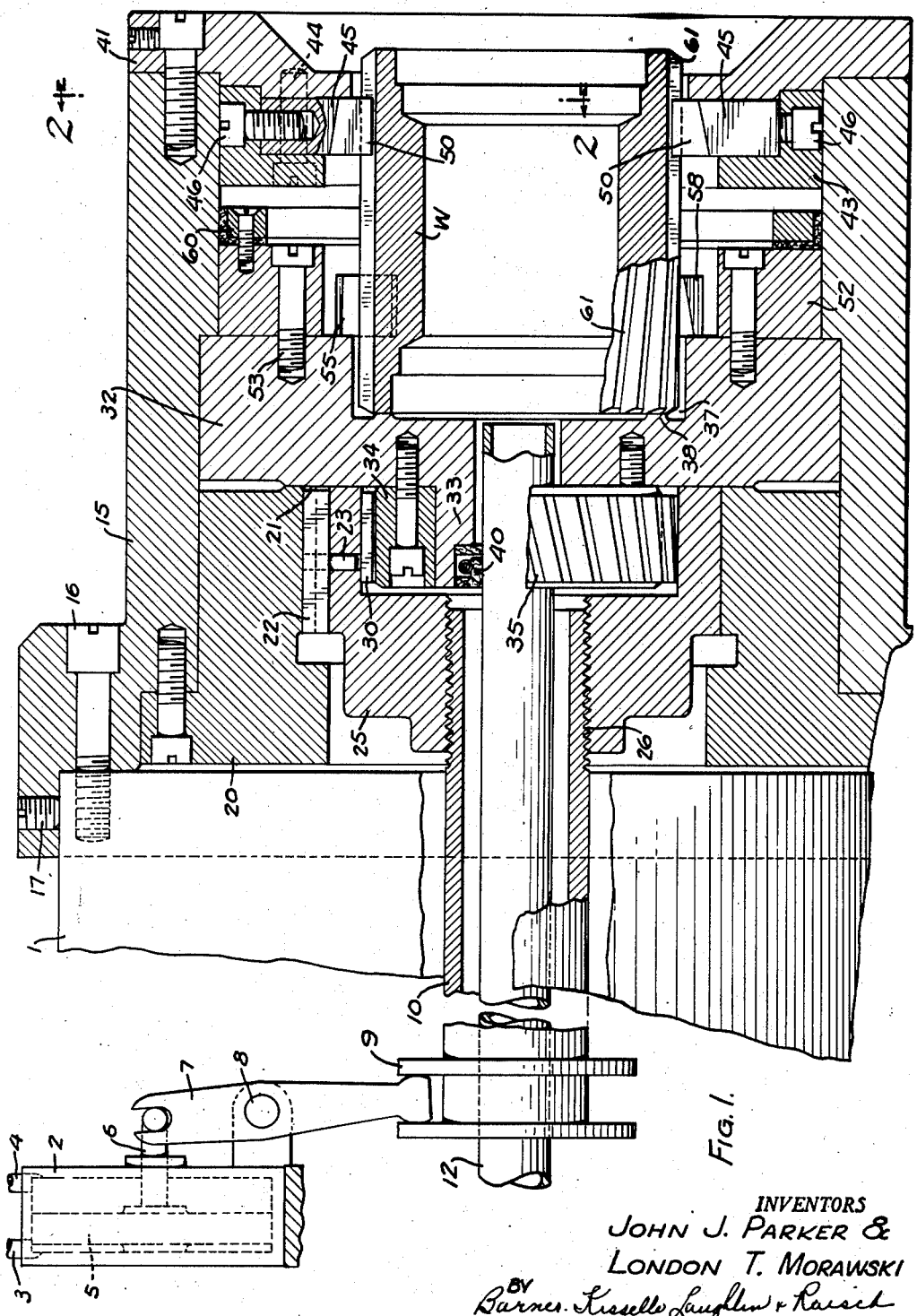
Fig. 1 is a view mostly in cross section illustrating the work holder with a work piece therein.

A rotary element of a machine tool, such as a spindle head, is shown at 1, and the chuck or holder of this invention may be mounted thereon. The operating means may conveniently be in the form of hydraulic actuated means including a cylinder 2 to which fluid under pressure may be introduced and exhausted through conduits 3 and 4 and in this cylinder is a piston 5 having a piston rod 6 acting upon a lever 7 pivoted as at 8. One end of the lever is in engagement with a double collar 9 which is mounted upon an actuating element 10 shown herein as in the form of a sleeve. Extending through the sleeve is a conduit 12 through which a coolant or lubricant may be passed to the work piece. A form of cutting oil is usually employed for this purpose.

The chuck has an outer member 15 which may be secured to the spindle head by screws 16, and it may be centered thereon by a plurality of screws, one of which is shown at 17. Within the member 15, and actually constituting a part thereof is a ring element 20 provided with a keyway 21 for receiving a key 22 which may be secured by means of a pin 23 to a shiftable operating element 25 connected to the sleeve 10, as by means of screw threads 26. The operating element 25 may thus be shifted axially but non-rotatably relative to the body 15. The actuating element 25 is formed with a recess in which are internal helical teeth 30. Rockably positioned within the outer member 15 is a member 32 having an extending hub portion 33 upon which is mounted a member 34 with helical teeth 35 in engagement with the helical teeth 30. The element 34 may be secured to the member 32 by screws, as shown. Axial shift of the member 25 causes, by reason of engagement of the helical teeth 30 and 35, oscillating or rocking movement of the member 32. The element 32 may be recessed as at 37 and provided with a shoulder or raised part 38 to be engaged by and to position the work piece, shown at W. The conduit 12 has its opened end communicating into the recess 37 and a fluid seal 40 may be disposed between the hub 33 and the conduit 12.

There is an end plate or ring 41 secured to the body 15 by screws, as shown, and this end piece has mounted thereon a carrier ring 43 which may be attached to the inner face thereof by cap screws 44. This carrier ring 43 supports and carries a plurality of work engaging elements 45 each of which may be secured to the ring by a cap screw 46. These work engaging elements are formed with tapered end portions with opposite flat faces 50 which will be considered in more detail later.

There is another carrier ring 52 secured to the oscillating element 32 by means of cap screws 53 and this carrier ring also carries and supports a plurality of work engaging elements 55. Where a work piece with helical teeth is to be engaged, the elements 55 may be circumferentially removed from the location of the elements 45 and, therefore, do not appear in full in Fig. 1, but are illustrated in Fig. 2. Each element 55 may be held to its ring 52 by a cap screw 56, as shown in Fig. 2. The elements 55 are essentially of the same formation as the holding elements 45, having end portions of tapered form with opposite surfaces 58. These surfaces are angularly disposed relative to a plane through the axis of the holder, the same as surfaces 50. A seal 60 is disposed at the intersection of the surface of the carrier member 52, and the interior surface of the member 15.

The work piece W is shown herein as in the form of a sleeve with external helical teeth 61. When the reciprocating element 25 is in the position shown in Fig. 1, the work piece may be positioned by passing it axially into the position shown until it abuts against the locating shoulder 36. Then by introducing the hydraulic medium the element 25 is shifted to the left as Fig. 1 is viewed. This, through the helical teeth 30 and 35, rocks member 32, carrier ring 52, and, therefore, the several elements 55 relative to the member 15. The work engaging elements 45 remain fixed relative to the member 15 and, therefore, the elements 55 and 45 grip the teeth of the work piece and hold it strongly in position. Any desired machine operation may then be performed on the work piece W. To release the work piece, the member 25 is shifted back to the right as Fig. 1 is viewed. This loosens the engagement of the work holding elements on the work piece. During the operations, the cutting oil is introduced to the work through the conduit 12 and the seals 40 and 60 keep the cutting oil and any abrasive substance therein from escaping into the operating parts of the holder.

In the developed view of Fig. 3, a single tooth is shown at 61a. This view being developed and flat does not show the curvature of the tooth as it extends partially around the circumference of the work piece. But it does show the changing appearance of the side faces of the tooth as shown at 61b and 61c. This tooth may be considered as the tooth indicated at 61a in Fig. 2 wherein the same tooth, by reason of a cut away showing, is indicated at the location of engagement by a holding element 45 and a holding element 55. There is a location on a helical tooth of the involute variety where the surface thereof is a straight line lengthwise of the tooth. This straight line is on a tangent to the base cylinder. The base circle or cylinder is shown at $x$ in Fig. 4, and the straight line on the tooth 61a (Fig. 4) is shown by the dotted line $y$. The flat faces of the work holding elements 50 and 58, while being readily formed in flat manner, are angularly disposed at a helix angle relative to the axis so that a line across the same is contiguous to the straight line $y$ across the tooth. Therefore, the flat faces 58 and 50 may engage an involute helical tooth with a line contact, as shown in Fig. 4. In Fig. 4, an element 55 is shown and its surface 58 engages the tooth 61a substantially at the line contact at $y$ which is a straight line tangent to the base cylinder $x$. In Fig. 2, it will be noted that the tooth 61a is so engaged by an element 45 and the same tooth is engaged on the opposite side thereof by an element 55.

Of course, the chuck may be used to engage a work piece with straight teeth or splines such as a spur gear, as shown in Fig. 5. Here the work piece W' has teeth 70 which parallel the axis of the work piece. Several work engaging elements 45' are shown, the position of which may correspond to the elements 45 and several work engaging elements 55' are shown which may correspond in position to the elements 55. In this case, however, the teeth 45' and 55' have their flat faces positioned so that each tooth 45' and 55' makes contact with a tooth on the work piece along a straight line parallel to the axis and preferably at about the pitch diameter. The line of contact may vary with variation of the angle between the two faces of a gripping tooth on the tool.

We claim:

1. A holder or chuck for a work piece provided with helical involute teeth such as a gear or splined piece comprising, a series of engaging elements having portions for projecting into spaces between teeth on the work piece, another series of engaging elements having portions for projecting into spaces between teeth on the work piece, means for mounting the two series of elements for relative rocking movement to cause said portions thereof to engage the side faces of the teeth of the work piece to thereby grip and hold the work piece, said portions having flat faces which are angularly disposed relative to the axis of the work piece so as to engage the teeth on the work piece in a substantially straight line contact where the contour of the teeth presents a substantially straight line for a substantial lengthwise distance thereof.

2. A holder or chuck for a work piece provided with helical involute teeth such as a gear or splined piece comprising, a series of engaging elements having portions for projecting into spaces between teeth on the work piece, another series of engaging elements having portions for projecting into spaces between teeth on the work piece, means for mounting the two series of elements for relative rocking movement about the axis of the work piece to cause said portions thereof to engage the side faces of the teeth of the work piece to thereby grip and hold the work piece, said portions having flat faces which are angularly disposed relative to the axis of the work piece so as to engage the teeth on the work piece in a substantially straight line contact where the contour of the teeth presents a substantially straight line for a substantial lengthwise distance thereof.

3. A holder or chuck for a work piece provided with helical involute teeth such as a gear or splined piece comprising, a series of engaging elements having portions for projecting into spaces between teeth on the work piece, another series of engaging elements having portions for projecting into spaces between teeth on the work piece, means for mounting the two series of elements for relative rocking movement to cause said portions thereof to engage the side faces of the teeth of the work piece to thereby grip and hold the work piece, said portions having flat faces which are angularly disposed relative to the axis of the work piece and relative to a radial plane through the respective portions so as to engage the teeth on the work piece in a substantially straight line contact where the contour of the teeth presents a substantially straight line for a substantial lengthwise distance thereof.

4. A holder or chuck for a work piece provided with helical involute teeth such as a gear or splined piece comprising, a series of engaging elements having portions for projecting into spaces between teeth on the work piece, another series of engaging elements having portions for projecting into spaces between teeth on the work piece, means for mounting one series of elements in a relatively fixed manner and means for mounting the other series of elements so that the same may be shifted rockably relative to the first named series to cause the portions thereof to engage side faces of the teeth on the work piece to thereby grip and hold the work piece, said portions having flat faces which are angularly disposed relative to a radial plane through the respective portions and which are angularly disposed relative to the axis of the work piece in a manner substantially corresponding to the angularity of the helical teeth on the work piece, and said flat faces being positioned to engage teeth on the work piece in a substantially straight line contact where the contour of the teeth presents a substantially straight line for a substantial lengthwise distance thereof.

5. A holder or chuck for a work piece provided with helical involute teeth such as a gear or splined piece comprising, a series of engaging elements having portions for projecting into spaces between teeth on the work piece, another series of engaging elements having portions for projecting into spaces between teeth on the work piece, said two series of elements being spaced axially of the work piece, means for mounting the two series of elements for relative rocking movement to cause said portions thereof to engage the side faces of the teeth of the work piece to thereby grip and hold the work piece, said portions having flat faces which are angularly disposed relative to a radial plane through the respective portions and relative to the axis of the work piece so as to engage teeth on the work piece in a substantially straight line contact where the contour of the teeth presents a substantially straight line for a substantial distance lengthwise thereof.

6. A holder or chuck for a work piece provided with helical involute teeth such as a gear or splined teeth comprising, a supporting member adapted to be mounted upon a rotary element, a series of work engaging elements fixedly positioned on the supporting member having portions for projecting into spaces between teeth on the work piece, another series of engaging elements having portions for projecting into spaces between teeth on the work piece, means for mounting said other series of engaging elements for rocking movement relative to the supporting member, whereby said series may be rocked relative to the first named series to cause the said portions on the engaging elements to engage side faces of the teeth on the work piece to thereby grip and hold the work piece, said portions having flat faces which are angularly disposed relative to a radial plane through the respective portions so as to engage the teeth on the work piece substantially with a straight line contact.

7. A holder or chuck for a work piece with helical involute teeth of the type having relatively movable engaging elements for engaging the side faces of the teeth, wherein the engaging elements have flat portions properly disposed for engaging the helical involute teeth of a work piece in a substantially straight line contact along a line extending generally lengthwise of the teeth.

8. The combination substantially as defined in claim 7 wherein said flat portions are disposed in a manner substantially corresponding to the angularity of the teeth on the work piece.

9. The combination substantially as defined in claim 7 wherein said flat portions are disposed at an angle to the axis of the work piece.

References Cited in the file of this patent

UNITED STATES PATENTS

| Number | Name | Date |
|---|---|---|
| 1,725,342 | Copland | Aug. 20, 1929 |
| 2,045,156 | Matchett | June 23, 1936 |
| 2,372,931 | Bregin | Apr. 3, 1945 |
| 2,394,624 | Matchett | Feb. 12, 1946 |
| 2,445,184 | Parket et al. | July 13, 1948 |
| 2,543,117 | Mackmann | Feb. 27, 1951 |
| 2,555,496 | Mackmann | June 5, 1951 |